DEFENSIVE PUBLICATION T861018

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 8, 1969

861 O.G. 368

617,846

AZIRIDINIUM SALTS OF 2-NITRO-1,3-INDANDIONES

Stephen J. Kuhn, 515 London Road, Sarnia, Ontario, Canada

Filed Feb. 23, 1967. Published Apr. 8, 1969

Class 260—239

No Drawing. 8 Pages Specification

Stable aziridinium (e.g. aziridinium or 2-methylaziridinium) salts of 2-nitro-1,3-indandiones (e.g. 2-nitro-1,3-indandione) are prepared by contacting an aziridine with a 2-nitro-1,3-indandione at a temperature between −10° and 30° C. The compounds have a demonstrated utility as insecticides against the beam aphid.